United States Patent
Leger (10) Patent No.: US 10,077,804 B2
(45) Date of Patent: Sep. 18, 2018

(54) BEARING FOR ROTARY CONTROL VALVE

(71) Applicant: FISHER CONTROLS INTERNATIONAL LLC, Marshalltown, IA (US)

(72) Inventor: Bryan Q. Leger, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 63 days.

(21) Appl. No.: 15/131,479

(22) Filed: Apr. 18, 2016

(65) Prior Publication Data

US 2016/0312901 A1    Oct. 27, 2016

Related U.S. Application Data

(60) Provisional application No. 62/152,647, filed on Apr. 24, 2015.

(51) Int. Cl.
    *F16K 1/22*    (2006.01)
    *F16C 17/04*   (2006.01)
    *F16C 17/10*   (2006.01)

(52) U.S. Cl.
    CPC .............. *F16C 17/04* (2013.01); *F16K 1/224* (2013.01); *F16C 17/10* (2013.01); *F16C 2361/91* (2013.01)

(58) Field of Classification Search
    CPC .......... F16C 17/04; F16C 17/10; F16K 1/224
    USPC ........................................ 251/214, 305, 308
    See application file for complete search history.

(56) References Cited

U.S. PATENT DOCUMENTS

| 2,885,532 A | 5/1959 | Fike |
| 4,134,175 A * | 1/1979 | Contoyanis ............. F16C 33/08 16/2.1 |
| 4,589,628 A * | 5/1986 | Barker .................. F16K 1/2268 251/214 |
| 8,356,795 B2 | 1/2013 | Schade |

(Continued)

FOREIGN PATENT DOCUMENTS

| DE | 102008014595 A1 | 9/2008 |
| EP | 0167869 A2 | 1/1986 |
| WO | WO-8002731 A1 | 12/1980 |

OTHER PUBLICATIONS

International Search Report for Application No. PCT/US2016/029134 dated Jun. 23, 2016.

(Continued)

*Primary Examiner* — Marina Tietjen
(74) *Attorney, Agent, or Firm* — Marshall, Gerstein & Borun LLP (57) ABSTRACT

A thrust bearing for use with a rotary valve is provided. The thrust bearing includes a journal portion and a thrust portion. The journal portion is sized to be disposed between a valve body of the rotary valve and a drive shaft of the rotary valve. The thrust portion is sized to be disposed between the valve body and a control member disposed within the valve body and movable relative to a valve seat disposed within the valve body via a drive shaft to control fluid flow through the valve body. The thrust portion includes a flat surface adapted to engage a corresponding flat surface of the valve body when the bearing is subject to a combined thrust and torsional load via the drive shaft, such that the bearing can accommodate the combined thrust and torsional load.

20 Claims, 5 Drawing Sheets

(56) References Cited

U.S. PATENT DOCUMENTS 8,662,099 B2 3/2014 Arnold et al.
2007/0245561 A1 10/2007 Miyauchi et al.

OTHER PUBLICATIONS

Written Opinion for Application No. PCT/US2016/029134 dated Jun. 23, 2016.

\* cited by examiner

BEARING FOR ROTARY CONTROL VALVE

FIELD OF THE DISCLOSURE

The disclosure generally relates to rotary control valves and more specifically to a thrust bearing for a rotary control valve that accommodates or tolerates thrust loading.

BACKGROUND OF THE DISCLOSURE

Process control systems often employ rotary valves, such as ball valves, butterfly valves, eccentric-disk valves, eccentric-plug valves, etc., to control the flow of process fluids. Rotary valves typically include a fluid control element (e.g., a disk, a ball, etc.) disposed in the fluid path and rotatably coupled to the body of the valve via a shaft. To control the flow of fluid through some rotary valves, the position of the fluid control element may be varied from a closed position at which the fluid control element is in sealing engagement with a seal that surrounds a flow aperture, thereby preventing fluid flow through the flow aperture, to a fully open or maximum flow rate position at which the fluid control element is spaced away from the seal, thereby allowing fluid flow through the flow aperture.

To enable the fluid control element to properly align with the seal, some rotary valves include one or more bearings. One known bearing is made of plastic (e.g., PEEK) and has a curved surface that is seated against a corresponding curved surface of the valve body. However, this curved surface, by having a complex geometry, complicates manufacturing, thereby increasing manufacturing cost. Moreover, in certain applications (e.g., under high pressures), such a bearing cannot tolerate or accommodate a thrust load (i.e., an axial load) while at the same time being subject to a torsional load (e.g., when the fluid control element is opening under pressure). Instead, when the curved plastic bearing is axially loaded while a torsional load is applied, the combined load causes the bearing to move in the axial direction, thereby unseating the bearing from the curved surface of the valve body and forcing the bearing into contact with other portions of the valve. Over time, the combined loading will cause the bearing to crack, leading to failure.

SUMMARY

In accordance with a first exemplary aspect, a rotary valve includes a valve body defining a fluid inlet and a fluid outlet, a valve seat arranged within the valve body, a closure member disposed within the valve body and movable relative to the valve seat via a drive shaft to control fluid flow through the valve body, and a bearing disposed in the valve body to maintain the closure member in alignment with the valve seat. The bearing has a first portion disposed between the valve body and the drive shaft and a second portion disposed between the valve body and the closure member. The second portion has a flat surface configured to engage a corresponding flat surface of the valve body when the bearing is subject to a combined thrust and torsional load via the drive shaft, such that the bearing can accommodate the combined thrust and torsional load.

In accordance with a second exemplary aspect, a rotary valve includes a valve body defining a fluid inlet and a fluid outlet, a valve seat arranged within the valve body, a closure member disposed within the valve body, a drive shaft disposed in a drive opening of the valve body and configured to move the closure member, relative to the valve seat, to control fluid flow through the valve body, and a bearing disposed in the drive opening between the valve body and the drive shaft to maintain the closure member in alignment with the valve seat. The bearing includes a body and a bearing flange that extends radially outward from the body. The bearing flange has a flat surface configured to engage a corresponding flat surface of the valve body when the bearing is subject to a combined thrust and torsional load via the drive shaft, such that the bearing can accommodate the combined thrust and torsional load.

In accordance with a third exemplary aspect, a thrust bearing for use with a rotary valve includes a journal portion and a thrust portion. The journal portion is sized to be disposed between a valve body of the rotary valve and a drive shaft of the rotary valve. The thrust portion is sized to be disposed between the valve body and a control member disposed within the valve body and movable relative to a valve seat disposed within the valve body via a drive shaft to control fluid flow through the valve body. The thrust portion includes a flat surface adapted to engage a corresponding flat surface of the valve body when the bearing is subject to a combined thrust and torsional load via the drive shaft, such that the bearing can accommodate the combined thrust and torsional load.

In further accordance with any one or more of the foregoing first, second, or third exemplary aspects, a rotary valve and/or a thrust bearing may include any one or more of the following further preferred forms.

In one preferred form, the drive shaft is oriented along a longitudinal axis, and the closure member rotates about the longitudinal axis.

In another preferred form, the flat surface extends in a direction substantially perpendicular to the longitudinal axis.

In another preferred form, the first portion of the bearing includes a journal bearing surface and the second portion of the bearing includes a thrust bearing surface.

In another preferred form, the first portion is integrally formed with the second portion.

In another preferred form, the first portion is fixedly coupled to the second portion.

In another preferred form, an entirety of the flat surface of the second portion engages the corresponding flat surface of the valve body when the bearing is subject to the combined thrust and torsional load.

In another preferred form, the valve body includes a curved ledge positioned radially outward of the corresponding flat surface, the curved ledge positioned immediately adjacent the flat surface of the bearing.

In another preferred form, the closure member includes a disk.

In another preferred form, the body of the bearing extends along the longitudinal axis and the bearing flange extends along an axis that is substantially perpendicular to the longitudinal axis.

In another preferred form, the body of the bearing includes a cylindrical body.

In another preferred form, the bearing flange includes a chamfered portion and a cylindrical portion, the cylindrical portion including the flat surface.

In another preferred form, the cylindrical portion includes first and second shoulders, and wherein the first shoulder faces the closure member and the second shoulder comprises the flat surface.

In another preferred form, the valve body includes a curved ledge positioned radially outward of the corresponding flat surface, the curved ledge positioned immediately adjacent the chamfered portion.

In another preferred form, an entirety of the flat surface engages the corresponding flat surface of the valve body when the bearing is subject to the combined thrust and torsional load.

In another preferred form, the journal portion includes a cylindrical body and the thrust portion includes a bearing flange that extends radially outward from the cylindrical body, the bearing flange including the flat surface.

In another preferred form, the bearing flange includes a chamfered portion and a cylindrical portion, the cylindrical portion including first and second shoulders, and wherein the second shoulder includes the flat surface.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several FIGS., in which:

DETAILED DESCRIPTION

Figure 1:
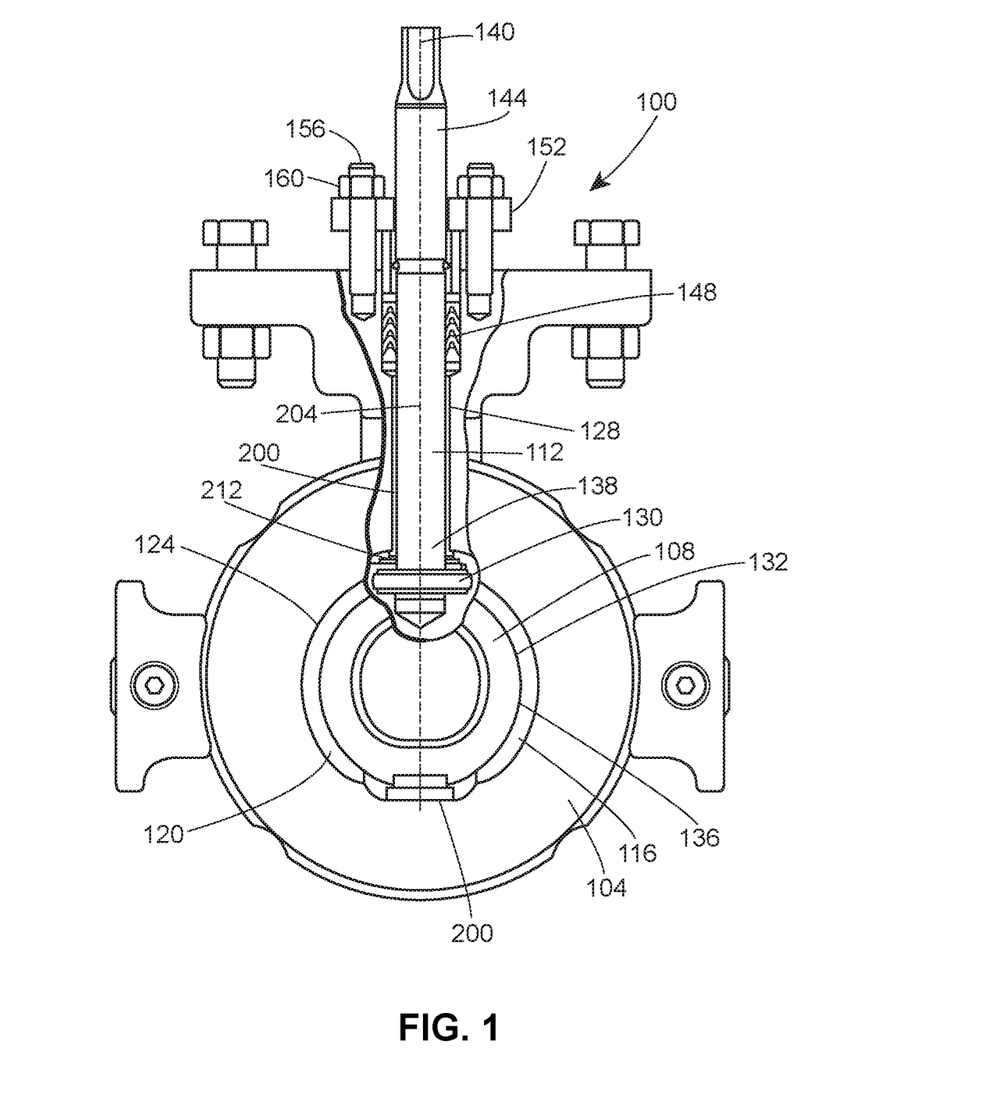
FIG. 1 is a longitudinal cross-sectional view of a rotary control valve including a first example of a thrust bearing constructed in accordance with the teachings of the present invention.

FIG. 1 is a longitudinal cross-sectional view of a rotary control valve 100 constructed in accordance with the principles of the present invention. The rotary valve 100 includes a valve body 104, a closure member 108 housed within the valve body 104, and a drive shaft 112 that operatively couples the closure member 108 to the valve body 104.

The valve body 104 is generally cylindrical and has a central opening 116 that defines a fluid flow passageway between a fluid inlet 120 and a fluid outlet 124. The valve body 104 also includes a drive opening 128 that is adapted to receive the drive shaft 112. The closure member 108 is disposed within the fluid flow passageway and is illustrated as a disk having a peripheral edge 132 that sealingly engages a valve seat or annular sealing surface 136 (e.g., a seal ring) disposed in the central opening 116 to prevent the flow of fluid through the valve 100. The drive shaft 112 is disposed in the drive opening 128 along a longitudinal axis 140. The closure member 108 is operatively coupled to one end 138 of the drive shaft 112 via a pin 130. In other examples, the closure member 108 can be operatively coupled to the drive shaft 112 by other connections, such as nuts, bolts, welds, adhesives, rivets, etc. In any event, when the closure member 108 is coupled to the drive shaft 112, the drive shaft 112 can move (e.g., rotate) the closure member 108 between a closed position, shown in FIG. 1, in which the peripheral edge 132 of the closure member 108 sealingly engages the valve seat 136 to close the valve 100, and an open position, not shown, in which the peripheral edge 132 of the closure member 108 is spaced from the valve seat 136 to permit fluid flow through the valve 100.

An actuator (not shown) may be operatively coupled to a second end 144 of the drive shaft 112 to drive (e.g., rotate) the closure member 108 between the closed position and the open position to control the flow of fluid through the valve 100. The second end 144 of the drive shaft 106 may be a splined end, a square end, a round end, or virtually any other shape that allows the second end 144 to operatively couple to the actuator. While not illustrated herein, the actuator can be a mechanical actuator (e.g., handle), a pneumatic actuator, a hydraulic actuator, an electric actuator, or any other suitable actuator.

As illustrated in FIG. 1, the valve 100 also includes a packing 148 that is disposed in the drive opening 128 of the valve body 102 and which engages the drive shaft 112 to prevent fluid leakage. A packing flange 152, which is coupled to the valve body 102 via packing flange studs 156 and bolts 160, retains the packing 148 in the desired position. The packing flange 152 may be adjusted to alter the force imparted on the packing 148, thereby altering the seal between the packing 148 and the drive shaft 112.

With continued reference to FIG. 1, the valve 100 further includes a pair of bearings 200 constructed in accordance with the teachings of the present invention. The bearings 200 are disposed in the drive opening 128 between the valve body 104 and the drive shaft 112 to facilitate rotation of the drive shaft 112. The bearings 200 also serve to align or axially locate the closure member 108 relative to the valve body 104, particularly the valve seat 136. More specifically, the bearings 200 align the closure member 108 along the longitudinal axis 140 and along a longitudinal axis 204 of the drive shaft 112, such that the closure member 108 is positioned, relative to the valve seat 136, so as to be able to control fluid flow through the valve 100 as desired.

It will be appreciated that the valve 100 can vary from the rotary valve 100 illustrated in FIG. 1. The shape and/or size of the valve body 104 can vary. The shape and/or size of the closure member 108 can vary as well. As an example, while the closure member 108 is illustrated as being a disk, the closure member 108 can, in other implementations, be a segmented ball or any other suitable closure member. Moreover, it will also be appreciated that the bearings 200 are not limited to the example valve 100 illustrated in FIG. 1 and can be employed with or in other types of rotary valves such as, for example, a ball valve, a segmented valve, etc.

Figure 2:
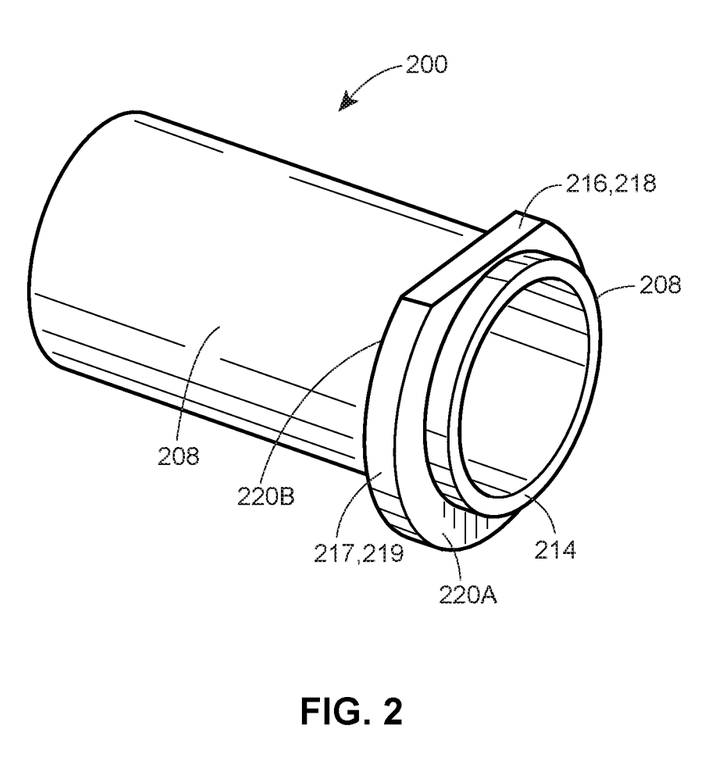
FIG. 2 is a close up isometric view of the thrust bearing of FIG. 1.

FIG. 2 illustrates one of the bearings 200 employed in the valve 100 in FIG. 1. The bearing 200 illustrated in FIG. 2 is made or formed of Polyether ether ketone (PEEK) and has a cylindrical body 208 and a D-shaped bearing flange 212 that extends radially outward from the body 208 adjacent or proximate to one end 214 of the body 208. The shape of the bearing flange 212 is generally defined by a chamfered portion 216 and a cylindrical portion 217. The chamfered portion 216 has a flat edge 218. The cylindrical portion 217 of the bearing flange 212 has a circumferential edge 219 and a pair of shoulders 220A, 220B that extend radially inward from the edge 216. The shoulder 220A is a flat surface that is adapted to be disposed between the valve body 104 and the closure member 108, while the shoulder 220B is a flat surface that is adapted to engage or seat against a corresponding flat surface of the valve body 104, as will be described in greater detail below. As will also be described in greater detail below, the shoulder 220B is configured to accommodate or tolerate thrust without failing. Accordingly, the shoulder 220B may also be referred to as a thrust bearing surface.

Figure 3:
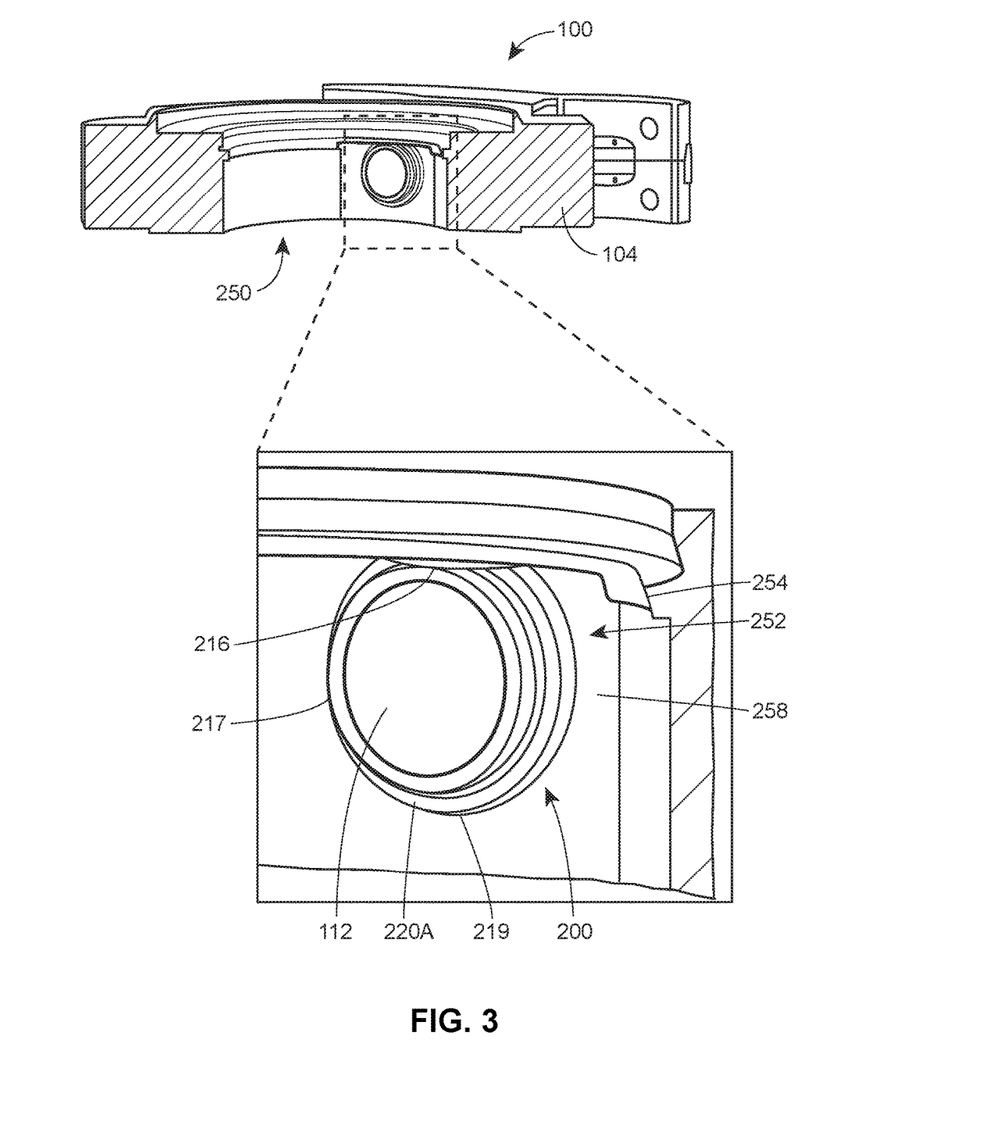
FIG. 3 is a close up, partial view of the rotary valve of FIG. 1 showing a portion of the thrust bearing of FIG. 2.

FIG. 3 illustrates a cut-away portion 250 of the valve 100 with one of the bearings 200 coupled thereto. The portion 250 of the valve 100 depicted in FIG. 3 corresponds to a portion of the valve body 104 that faces a top surface of the closure member 108 (at least when viewed in FIG. 1). This portion 250 includes a thrust feature 252 that takes the form of a curved ledge 254 and a flat surface 258 positioned inward of the curved ledge 254. It will be appreciated that the structure and position of the curved ledge 254 facilitates the usage of the D-shaped bearing 200 (unlike known ledges, which are not structured and positioned to accommodate full-shaped bearings). In this example, manufacturing or forming the thrust feature 252 involves milling the backside of the valve 100 to a pre-determined depth that allows the bearing 200 to be maximized without comprising the geometry of the seal cavity (i.e., the curved ledge 254). Of course, the thrust feature 252 can be pre-formed in the valve body 104 or manufactured in some other suitable manner.

Figure 4:
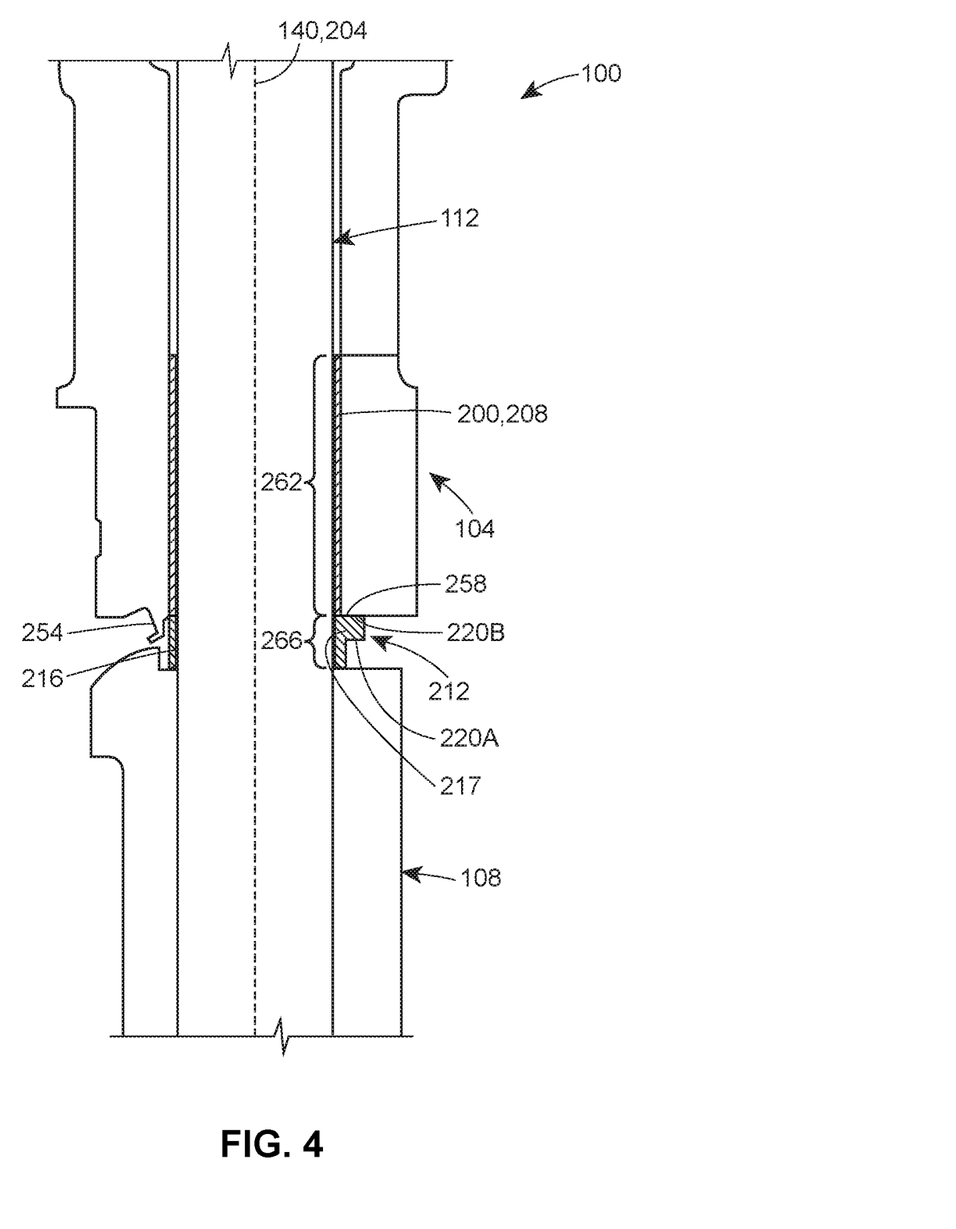
FIG. 4 is a cross-sectional view of the thrust bearing of FIG. 2 arranged in the rotary control valve of FIG. 1.

As illustrated in FIGS. 3 and 4, the bearing 200 is coupled to the portion 250 of the valve 100 such that a first portion 262 of the bearing 200 is disposed between the valve body 104 and the drive shaft 112, and a second portion 266 of the bearing 200 is disposed between the valve body 104 and the closure member 108. The first portion 262, which includes a substantial portion of the bearing body 208, extends along the longitudinal axis 140 and serves as the journal bearing portion. The second portion 266, which includes the bearing flange 212 and, more particularly, the chamfered portion 216, is disposed between the valve body 104 and the closure member 108. The chamfered portion 216 is positioned immediately adjacent the curved ledge 254. As illustrated, the shoulder 220A faces the closure member 108, while the shoulder 220B of the bearing 200 engages or seats against the flat surface 258. The shoulders 220A, 220B, which extend radially outward from the body 208, extend along an axis that is substantially perpendicular to the longitudinal axis 140 and the longitudinal axis 204 (i.e., the flange 212 is substantially perpendicular to the longitudinal axis 140 and the longitudinal axis 204). So arranged, the second portion 266 serves as the thrust bearing portion.

While FIGS. 3 and 4 only illustrate one of the bearings 200 coupled to the valve 100 and only one thrust feature 252, it will be appreciated that the valve 100 includes an additional thrust feature (not shown) that is identical to the thrust feature 252, as well as another bearing 200 that is coupled to the valve body 104 in a similar manner, as very generally illustrated in FIG. 1.

In operation, the actuator drives the closure member 108 between the open position, whereby fluid can flow through the fluid flow passageway of the valve 100, and a closed position, whereby the closure member 108 engages the sealing surface 136 to effect a seal and provide a shutoff (i.e., prevent the flow of fluid through the fluid flow passageway of the valve 100). When the actuator drives the closure member 108 to the open position, a torsional load is applied to the bearings 200. When this torsional load is applied in concert with a thrust load (axial loading along the longitudinal axis 140), conventional bearings, such as the curved bearing discussed above in the background section, tend to unseat from the valve body 104, and, over time, typically fail. This is particularly true when a drive shaft of a rotary valve is unbalanced, as the shaft 112 is (because the packing 148 is only located on the drive shaft end, thereby creating an unbalanced force on the shaft 112 when the valve 100 is pressurized). However, the bearings 200 respond differently to such a combined load. Instead, when the bearings 200 are subject to a combined thrust and torsional load, the bearings 200 remain seated against and are supported by the valve body 104, such that the bearings 200 can accommodate or tolerate such a combined load. While the bearings 200 will rotate in response to the application of a combined torsional and thrust load, the shoulder 220B of each bearing 200 will not axially move (i.e., will not move along the longitudinal axis 140), and will instead remain in contact with the respective flat surface 258. As both the shoulders 220B and the surfaces 258 are flat and parallel to one another, the entirety of each shoulder 220B will engage the respective flat surface 258, such that each flat surface 258 supports the corresponding shoulder 220B over its entirety. In other words, the flat surfaces 258, and more generally the valve body 104, fully support(s) the shoulders 220B. In this manner, the bearings 200 are able to accommodate or tolerate a combined thrust and torsional load (i.e., the bearings 200 will not fail in response to a combined thrust and torsional load, even after a number of cycles).

Figure 5:
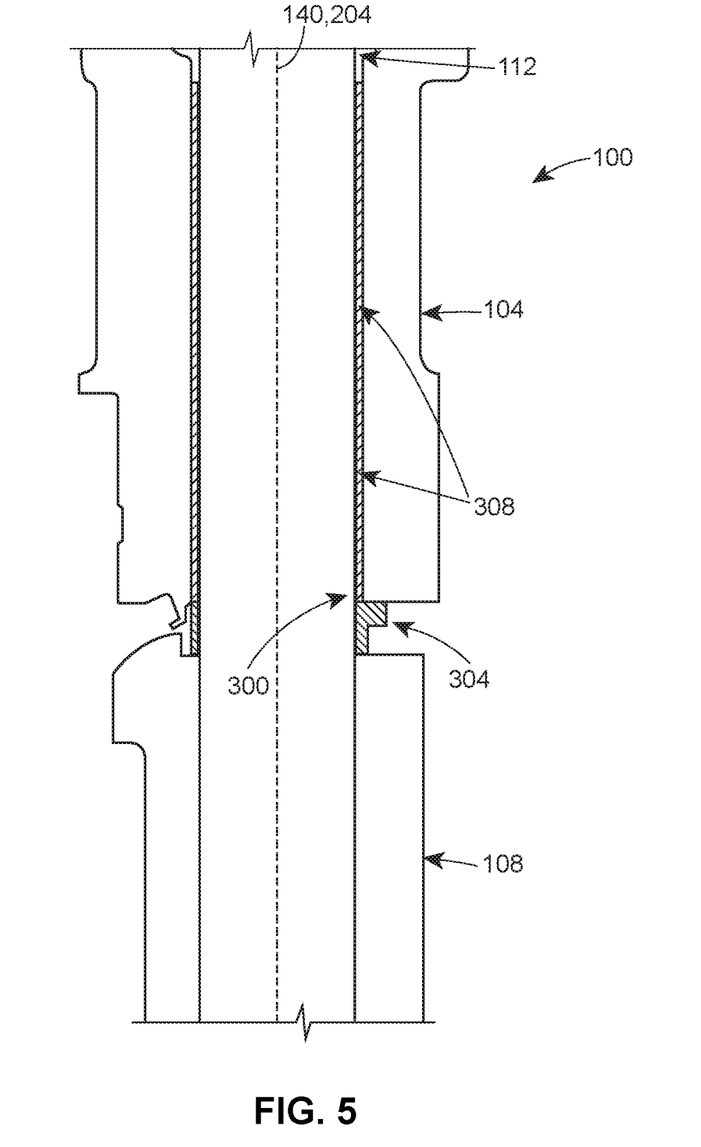
FIG. 5 is a cross-sectional view of a second example of a thrust bearing constructed in accordance with the teachings of the present invention and arranged in the rotary control valve of FIG. 1.

While the bearing 200 is made of or formed of PEEK, it will be appreciated that the bearing 200 can instead be made of or formed of a different type of plastic, one or more metals, and/or any other suitable materials. In some cases, the bearing 200 can be made or formed of both a plastic and a metal material. As an example, the bearing 200 can be made of metal but lined with a soft plastic. Moreover, while the bearing 200 is described as being a one-piece bearing, the bearing 200 can alternatively be made of two or more components or parts. FIG. 5 illustrates an example of such an alternative bearing, in the form of a bearing 300 that includes a first or thrust portion 304 and a second or journal portion 308 coupled to the first portion 304. In the illustrated example, the second portion 308 is fixedly coupled (e.g., adhered, welded, etc.) to the first portion 304, though in other examples, the second portion 308 can be removably coupled to the first portion 304. The first portion 304 is substantially similar to the second portion 266 described above, while the second portion 308 is substantially similar to the first portion 262 described above. The first and second portions 304, 308 can be made of the same material (e.g., metal, PEEK) or different materials (e.g., the first portion 304 can be made of metal, while the second portion 308 can be made of plastic). Other multi-part bearings are possible as well. In any event, the two-piece bearing 300, as well as other bearings involving two or more parts, is possible due to the structure of the thrust feature 252 (which, as noted above, includes a modified ledge 254).

Although certain bearings have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The invention claimed is:
1. A rotary valve, comprising:
a valve body defining a fluid inlet and a fluid outlet;
a valve seat arranged within the valve body;

a closure member disposed within the valve body and movable relative to the valve seat via a drive shaft to control fluid flow through the valve body; and a bearing disposed in the valve body to maintain the closure member in alignment with the valve seat, the bearing having a first portion disposed between the valve body and the drive shaft and a second portion disposed between the valve body and the closure member, the second portion having a first flat surface spaced from each of the valve body and the closure member, and a second flat surface configured to engage a corresponding flat surface of the valve body when the bearing is subject to a combined thrust and torsional load via the drive shaft, such that the bearing can accommodate the combined thrust and torsional load.

2. The rotary valve of claim 1, wherein the drive shaft is oriented along a longitudinal axis, and wherein the closure member rotates about the longitudinal axis.

3. The rotary valve of claim 2, wherein the second flat surface extends in a direction substantially perpendicular to the longitudinal axis.

4. The rotary valve of claim 1, wherein the first portion of the bearing comprises a journal bearing surface and the second portion of the bearing comprises a thrust bearing surface.

5. The rotary valve of claim 1, wherein the first portion is integrally formed with the second portion.

6. The rotary valve of claim 1, wherein the first portion is fixedly coupled to the second portion.

7. The rotary valve of claim 1, wherein an entirety of the second flat surface of the second portion engages the corresponding flat surface of the valve body when the bearing is subject to the combined thrust and torsional load.

8. The rotary valve of claim 1, wherein the valve body comprises a curved ledge positioned radially outward of the corresponding flat surface, the curved ledge positioned immediately adjacent the second flat surface of the bearing.

9. The rotary valve of claim 1, wherein the closure member comprises a disk.

10. A rotary valve, comprising:
a valve body defining a fluid inlet and a fluid outlet, the valve body including a drive opening;
a valve seat arranged within the valve body;
a closure member disposed within the valve body;
a drive shaft disposed in the drive opening and configured to move the closure member, relative to the valve seat, to control fluid flow through the valve body; and
a bearing disposed in the drive opening between the valve body and the drive shaft to maintain the closure member in alignment with the valve seat, the bearing comprising a body and a bearing flange that extends radially outward from the body at a position between first and second ends of the bearing, the bearing flange having a flat surface configured to engage a corresponding flat surface of the valve body when the bearing is subject to a combined thrust and torsional load via the drive shaft, such that the bearing can accommodate the combined thrust and torsional load.

11. The rotary valve of claim 10, wherein the drive shaft is oriented along a longitudinal axis, and wherein the closure member rotates about the longitudinal axis.

12. The rotary valve of claim 11, wherein the body extends along the longitudinal axis and the bearing flange extends along an axis that is substantially perpendicular to the longitudinal axis.

13. The rotary valve of claim 10, wherein the body comprises a cylindrical body.

14. The rotary valve of claim 10, wherein the bearing flange comprises a chamfered portion and a cylindrical portion, the cylindrical portion including the flat surface.

15. The rotary valve of claim 14, wherein the cylindrical portion includes first and second shoulders, and wherein the first shoulder faces the closure member and the second shoulder comprises the flat surface.

16. The rotary valve of claim 15, wherein the valve body comprises a curved ledge positioned radially outward of the corresponding flat surface, the curved ledge positioned immediately adjacent the chamfered portion.

17. The rotary valve of claim 10, wherein an entirety of the flat surface engages the corresponding flat surface of the valve body when the bearing is subject to the combined thrust and torsional load.

18. A thrust bearing for use with a rotary valve comprising a valve body, a valve seat disposed within the valve body, and a closure member disposed within the valve body and movable relative to the valve seat via a drive shaft to control fluid flow through the valve body, the thrust bearing comprising:
a journal portion sized to be disposed between the valve body and the drive shaft; and
a thrust portion sized to be disposed between the valve body and the closure member, the thrust portion having a first flat surface adapted to be spaced from each of the valve body and the closure member, and a second flat surface adapted to engage a corresponding flat surface of the valve body when the bearing is subject to a combined thrust and torsional load via the drive shaft, such that the bearing can accommodate the combined thrust and torsional load.

19. The thrust bearing of claim 18, wherein the journal portion comprises a cylindrical body and the thrust portion comprises a bearing flange that extends radially outward from the cylindrical body, the bearing flange including the first and second flat surfaces.

20. The thrust bearing of claim 19, wherein the bearing flange comprises a chamfered portion and a cylindrical portion, the cylindrical portion including first and second shoulders, wherein the first shoulder comprises the first flat surface and wherein the second shoulder comprises the second flat surface.

* * * * *